US012725863B2

(12) United States Patent
Zhang et al.

(10) Patent No.: US 12,725,863 B2
(45) Date of Patent: Sep. 1, 2026

(54) BATTERY PACK WITH REINFORCEMENT MEMBER AND PRESSURE RELIEF STRUCTURE

(71) Applicant: CALB Group Co., Ltd., Jiangsu (CN)

(72) Inventors: Zhaohong Zhang, Changzhou (CN); Jie Liu, Changzhou (CN); Xinwei Jiang, Changzhou (CN)

(73) Assignee: CALB Group Co., Ltd., Jiangsu (CN)

( * ) Notice: Subject to any disclaimer, the term of this patent is extended or adjusted under 35 U.S.C. 154(b) by 748 days.

(21) Appl. No.: 18/183,143

(22) Filed: Mar. 13, 2023

(65) Prior Publication Data

US 2024/0154223 A1 May 9, 2024

(30) Foreign Application Priority Data

Nov. 7, 2022 (CN) ........................ 202211387484.0

(51) Int. Cl.
*H01M 50/204* (2021.01)
*H01M 50/289* (2021.01)
(Continued)

(52) U.S. Cl.
CPC ....... *H01M 50/204* (2021.01); *H01M 50/289* (2021.01); *H01M 50/35* (2021.01); *H01M 50/367* (2021.01)

(58) Field of Classification Search
CPC .. H01M 50/242; H01M 50/367; H01M 50/30; H01M 50/3425; H01M 2200/20; H01M 50/325
See application file for complete search history.

(56) References Cited

U.S. PATENT DOCUMENTS 10,333,122 B2 6/2019 Miyawaki
11,302,972 B2 4/2022 Chu et al.
(Continued)

FOREIGN PATENT DOCUMENTS

CN 106410090 2/2017
CN 218548706 2/2023

OTHER PUBLICATIONS

"Office Action of China Counterpart Application", issued on Aug. 29, 2025, p. 1-p. 7.
(Continued)

*Primary Examiner* — Imran Akram
(74) *Attorney, Agent, or Firm* — JCIP GLOBAL INC.

(57) ABSTRACT

The disclosure relates to the technical field of batteries, and provides a battery pack, including: a battery box body; a pressure relief structure, which is disposed on the battery box body; a first battery assembly, which includes a plurality of first single cells arranged along a first direction, and the first battery assembly is arranged in the battery box body; a reinforcement member, which is disposed in the battery box body, and is located between the battery box body and the first battery assembly, the reinforcement member is provided with a gas guiding channel, the gas guiding channel includes a first opening, and the orthographic projection of the first opening facing a surface of the battery box body provided with a pressure relief structure coincides with at least part of the pressure relief structure, such that gas discharged from the first opening is in contact with the pressure relief structure.

18 Claims, 5 Drawing Sheets

(51) Int. Cl.
*H01M 50/35* (2021.01)
*H01M 50/367* (2021.01)

(56) References Cited

U.S. PATENT DOCUMENTS

| | | | | |
|---|---|---|---|---|
| 2017/0033343 | A1* | 2/2017 | Miyawaki | H01M 50/30 |
| 2018/0069222 | A1* | 3/2018 | Shaffer, II | H01M 10/044 |
| 2018/0083244 | A1* | 3/2018 | Montgomery | H01M 50/30 |
| 2021/0104798 | A1 | 4/2021 | Jiang et al. | |
| 2021/0328281 | A1* | 10/2021 | Chu | H01M 50/204 |
| 2022/0013839 | A1* | 1/2022 | Zeng | H01M 10/0525 |
| 2022/0013849 | A1* | 1/2022 | Zeng | H01M 50/209 |
| 2022/0123390 | A1* | 4/2022 | Zhao | H01M 10/625 |
| 2022/0333706 | A1* | 10/2022 | Zhang | F16K 17/196 |
| 2023/0031476 | A1* | 2/2023 | Lei | H01M 50/367 |
| 2023/0040343 | A1* | 2/2023 | Gao | H01M 50/24 |
| 2023/0070013 | A1* | 3/2023 | Hernandez Saab | H01M 50/10 |
| 2023/0253664 | A1* | 8/2023 | Wang | H01M 50/103<br>429/53 |

OTHER PUBLICATIONS

"Search Report of Europe Counterpart Application", issued on Dec. 11, 2023, p. 1-p. 30.
"Search Report of Europe Counterpart Application", issued on Aug. 21, 2023, p. 1-p. 30.
"Examination Report of India Counterpart Application", issued on Mar. 18, 2026, p. 1-p. 7.
"Decision of Rejection of China Counterpart Application", issued on Mar. 12, 2026, with English translation thereof, p. 1-p. 15.

* cited by examiner

BATTERY PACK WITH REINFORCEMENT MEMBER AND PRESSURE RELIEF STRUCTURE

CROSS-REFERENCE TO RELATED APPLICATION

This application claims the priority of China patent application serial no. 202211387484.0, filed on Nov. 7, 2022. The entirety of the above-mentioned patent application is hereby incorporated by reference herein and made a part of this specification.

BACKGROUND

Technical Field

The disclosure relates to the technical field of batteries, in particular to a battery pack.

DESCRIPTION OF RELATED ART

The gas generated when the battery in the battery pack is thermally runaway will be discharged from the explosion-proof valve of the box. However, in related art, due to the distribution of the internal structure of the battery pack, the problem that the explosion-proof valve cannot be opened in time is likely to occur, and the discharge of gas will be affected.

SUMMARY

The disclosure provides a battery pack. The disclosure provides a battery pack, including: a battery box body; a pressure relief structure, which is disposed on the battery box body; a first battery assembly, which includes a plurality of first single cells arranged along a first direction, and the first battery assembly is arranged in the battery box body; a reinforcement member, which is disposed in the battery box body, and is located between the battery box body and the first battery assembly, the reinforcement member is provided with a gas guiding channel, the gas guiding channel includes a first opening, and the orthographic projection of the first opening facing a surface of the battery box body provided with a pressure relief structure coincides with at least part of the pressure relief structure, such that gas discharged from the first opening is in contact with the pressure relief structure.

The battery pack in an embodiment of the present disclosure includes a battery box body, a pressure relief structure, a first battery assembly, and a reinforcement member. The pressure relief structure is disposed in the battery box body, and a plurality of first single cells of the first battery assembly are disposed in the battery box body, and the reinforcement member is disposed between the battery box body and the first battery assembly.

BRIEF DESCRIPTION OF THE DRAWINGS

For a better understanding of the disclosure, reference may be made to exemplary embodiments shown in the following drawings. The components in the drawings are not necessarily to scale and related elements may be omitted, or in some instances proportions may have been exaggerated, so as to emphasize and clearly illustrate the features described herein. In addition, related elements or components can be variously arranged, as known in the art. Further, in the drawings, like reference numerals designate same or like parts throughout the several views.

DESCRIPTION OF THE EMBODIMENTS

Figure 1:
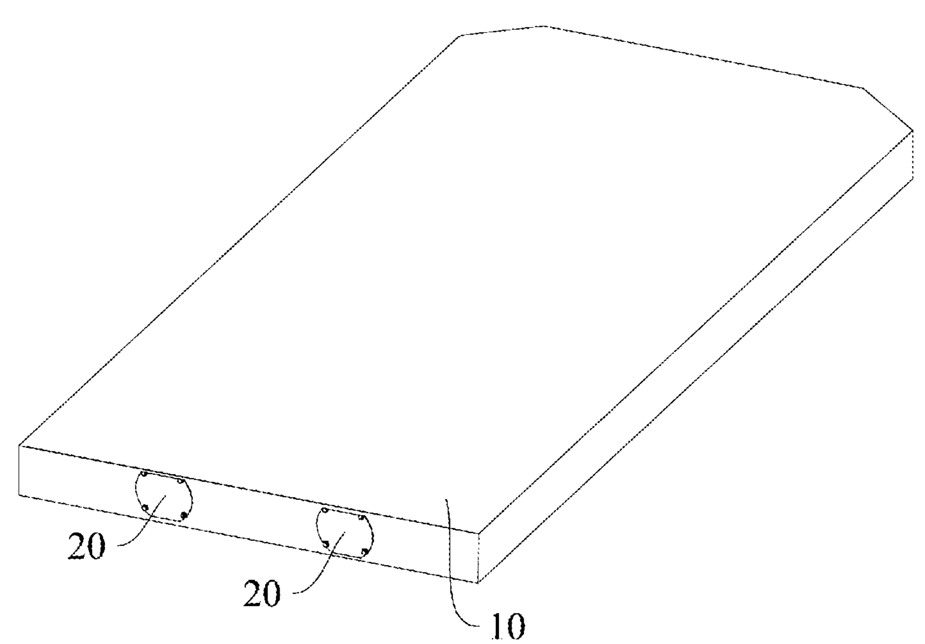
FIG. 1 is a schematic structural diagram of a battery pack according to an exemplary embodiment.

The technical solutions in the exemplary embodiments of the disclosure will be described clearly and explicitly in conjunction with the drawings in the exemplary embodiments of the disclosure. The description proposed herein is just the exemplary embodiments for the purpose of illustrations only, not intended to limit the scope of the disclosure, so it should be understood that and various modifications and variations could be made thereto without departing from the scope of the disclosure.

In the description of the present disclosure, unless otherwise specifically defined and limited, the terms "first", "second" and the like are only used for illustrative purposes and are not to be construed as expressing or implying a relative importance. The term "plurality" is two or more. The term "and/or" includes any and all combinations of one or more of the associated listed items.

In particular, a reference to "the" object or "a" and "an" object is intended to denote also one of a possible plurality of such objects. Unless otherwise defined or described, the terms "connect", "fix" should be broadly interpreted, for example, the term "connect" can be "fixedly connect", "detachably connect", "integrally connect", "electrically connect" or "signal connect". The term "connect" also can be "directly connect" or "indirectly connect via a medium". For the persons skilled in the art, the specific meanings of the abovementioned terms in the present disclosure can be understood according to the specific situation.

Further, in the description of the present disclosure, it should be understood that spatially relative terms, such as "above", "below" "inside", "outside" and the like, are described based on orientations illustrated in the figures, but are not intended to limit the exemplary embodiments of the present disclosure.

In the context, it should also be understood that when an element or features is provided "outside" or "inside" of another element(s), it can be directly provided "outside" or "inside" of the other element, or be indirectly provided "outside" or "inside" of the another element(s) by an intermediate element.

An embodiment of the present disclosure provides a battery pack, please refer to FIG. 1 to FIG. 6, the battery pack includes: a battery box body 10; a pressure relief structure 20, the pressure relief structure 20 is disposed on the battery box body 10; a first battery assembly 30, the first battery assembly 30 includes a plurality of first single cells 31 arranged along the first direction, and the first battery assembly 30 is arranged in the battery box body 10; a reinforcement member 40, the reinforcement member 40 is arranged in the battery box body 10, and located between the battery box body 10 and the first battery assembly 30. The reinforcement member 40 is provided with a gas guiding channel 41, the gas guiding channel 41 includes a first opening 411, and the orthographic projection of the first opening 411 facing a surface of the battery box body provided with the pressure relief structure 20 coincides with at least part of the pressure relief structure 20, such that gas discharged from the first opening 411 is in contact with the pressure relief structure 20.

The battery pack in an embodiment of the present disclosure includes a battery box body 10, a pressure relief structure 20, a first battery assembly 30, and a reinforcement member 40. The pressure relief structure 20 is disposed in the battery box body 10, and a plurality of first single cells 31 of the first battery assembly 30 are disposed in the battery box body 10, and the reinforcement member 40 is disposed between the battery box body 10 and the first battery assembly 30, so as to improve the connection strength between the first single cell 31 and the battery box body 10. By providing a gas guiding channel 41 on the reinforcement member 40, and the first opening 411 of the gas guiding channel 41 is set facing the pressure relief structure 20, gas may be stored in the gas guiding channel 41, and the pressure relief structure 20 may be opened in time, so that the gas generated during thermal runaway may be discharged out of the battery box body 10 in time, thus ensuring the safe use of the battery pack.

It should be noted that the reinforcement member 40 is disposed between the battery box body 10 and the first battery assembly 30, that is, the reinforcement member 40 realizes the pressing and fixing of the battery box body 10 and the first battery assembly 30, thereby ensuring that the first battery assembly 30 is stably disposed in the battery box body 10. A gas guiding channel 41 is disposed on the reinforcement member 40. In this case, the gas guiding channel 41 may be used for gas collection. Therefore, after a thermal runaway problem occurs to a battery in the battery box body 10, the gas discharged from the battery may be collected in the gas guiding channel 41, such that the gas in the gas guiding channel 41 is able to open the pressure relief structure 20 in time, so as to discharge the gas from the battery box body 10, and ensure the safety performance of the battery pack. The reinforcement member 40 is arranged opposite to the pressure relief structure 20, and the gas guiding channel 41 is arranged opposite to the pressure relief structure 20, so it is possible to prevent other structures from blocking the pressure relief structure 20. Therefore, it may be ensured that, when the pressure in the battery box body 10 reaches a certain value, the pressure relief structure 20 may be opened, so as to discharge the gas out of the battery box body 10.

The orthographic projection of the first opening 411 facing a surface of the battery box body 10 provided with the pressure relief structure 20 coincides with at least part of the pressure relief structure 20, that is, at least part of the first opening 411 may be directly opposite to the pressure relief structure 20, so that the gas discharged from the first opening 411 is contact with the pressure relief structure 20. In this manner, it is possible to ensure that the gas in the battery box body 10 is able to open the pressure relief structure 20 in time.

The pressure relief structure 20 may be a valve body. When the pressure in the gas guiding channel 41 reaches a certain value, the rear valve body may be opened, so as to discharge the gas out of the battery box body 10. The pressure relief structure 20 may be similar to an explosion-proof structure, such as an explosion-proof valve. When the pressure in the battery box body 10 reaches a certain value, the explosion-proof structure may be broken through, so that the gas may be discharged out of the battery box body 10. The pressure relief structure 20 may also be a structure with a relatively low-strength, such as a thin aluminum plate. When the pressure in the battery box body 10 reaches a certain value, the thin aluminum plate may be broken through, so that the gas may be discharged out of the battery box body 10. The pressure relief structure 20 may also be a nick as long as its strength is relatively low.

Figure 5:
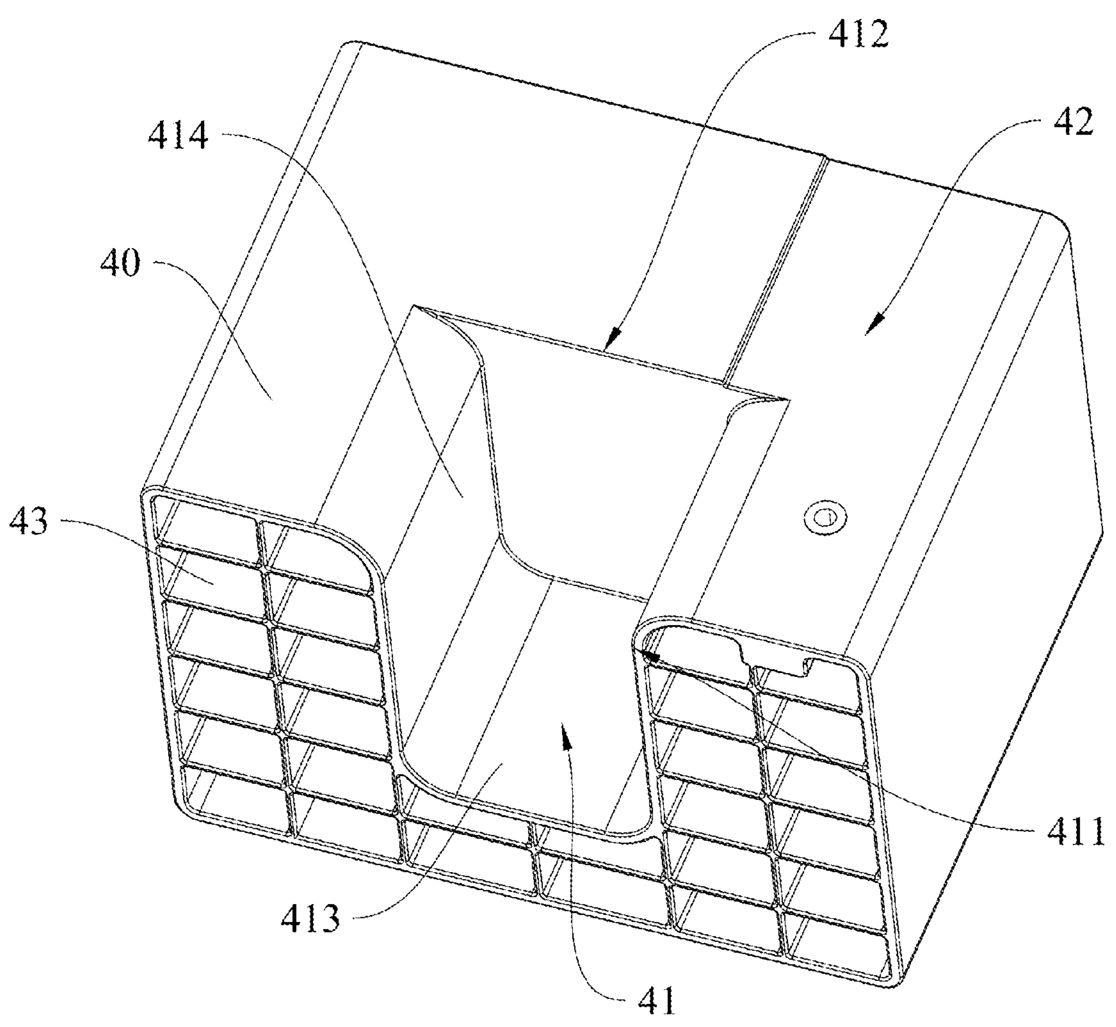
FIG. 5 is a schematic structural diagram of a spacer according to an exemplary embodiment.
Figure 6:
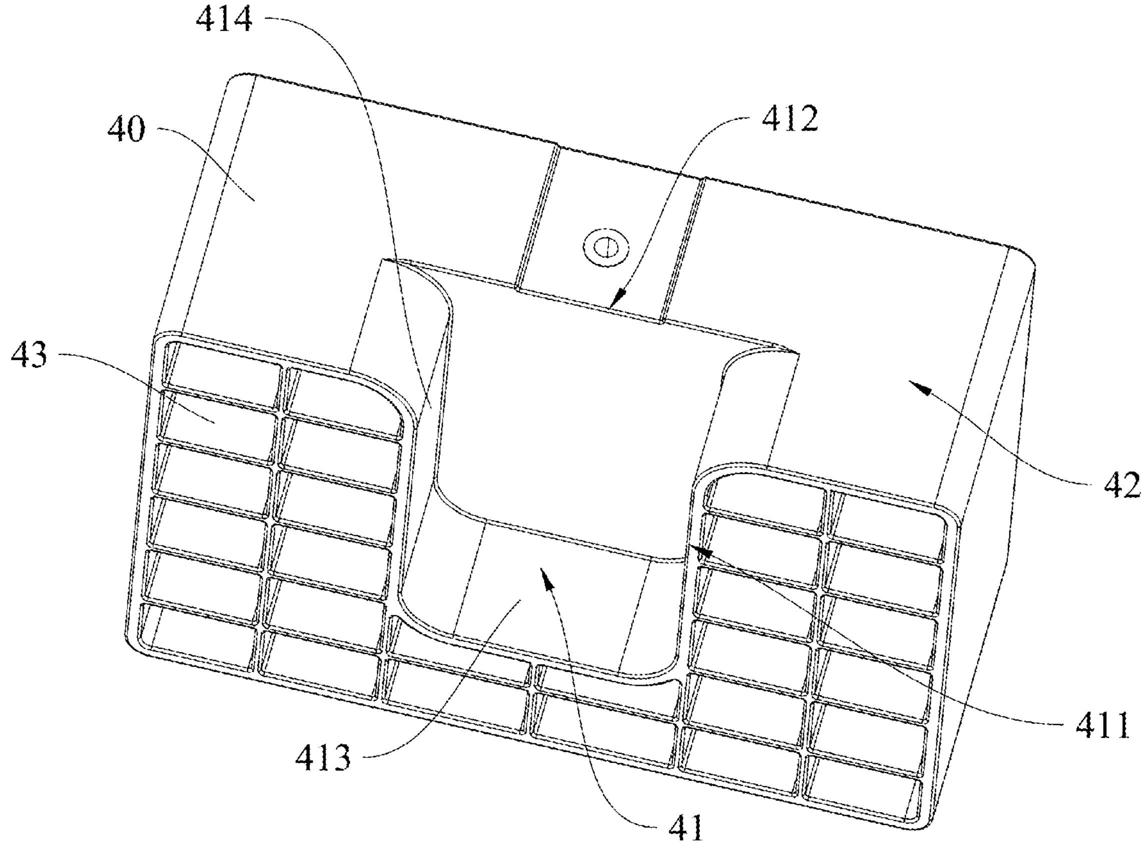
FIG. 6 is a schematic structural diagram of a spacer according to another exemplary embodiment.

In an embodiment, as shown in FIG. 5 and FIG. 6, the gas guiding channel 41 further includes a second opening 412. The first opening 411 intersects the second opening 412, that is, the gas in the battery box body 10 may be collected in the gas guiding channel 41 through the first opening 411 and the second opening 412, and may be in contact with the pressure relief structure through the first opening 411. In this way, it is possible to ensure that the gas in the gas guiding channel 41 is able to open the pressure relief structure 20.

In an embodiment, the pressure relief structure 20 is disposed on a side portion of the battery box body 10. The first opening 411 is disposed on one side of the reinforcement member facing the side portion of the battery box body 10, and the second opening 412 is disposed on one side of the reinforcement member 40 facing the top portion of the battery box body 10. The gas in the battery box body 10 may enter the gas guiding channel 41 through the second opening 412, and may be in contact with the pressure relief structure 20 through the second opening 412. In this way, when the pressure in the gas guiding channel 41 reaches a certain value, the gas is able to open the pressure relief structure 20 to release the gas from the battery box body 10 to ensure the safety performance of the battery pack.

In some embodiments, it is not excluded that the pressure relief structure 20 is disposed at the top portion of the battery box body 10, or it is not excluded that the pressure relief structure is disposed at the bottom portion of the battery box body 10. Correspondingly, the first opening 411 needs to be set opposite to the pressure relief structure 20, so as to ensure that the gas in the gas guiding channel 41 is able to open the pressure relief structure 20 in time.

Figure 2:
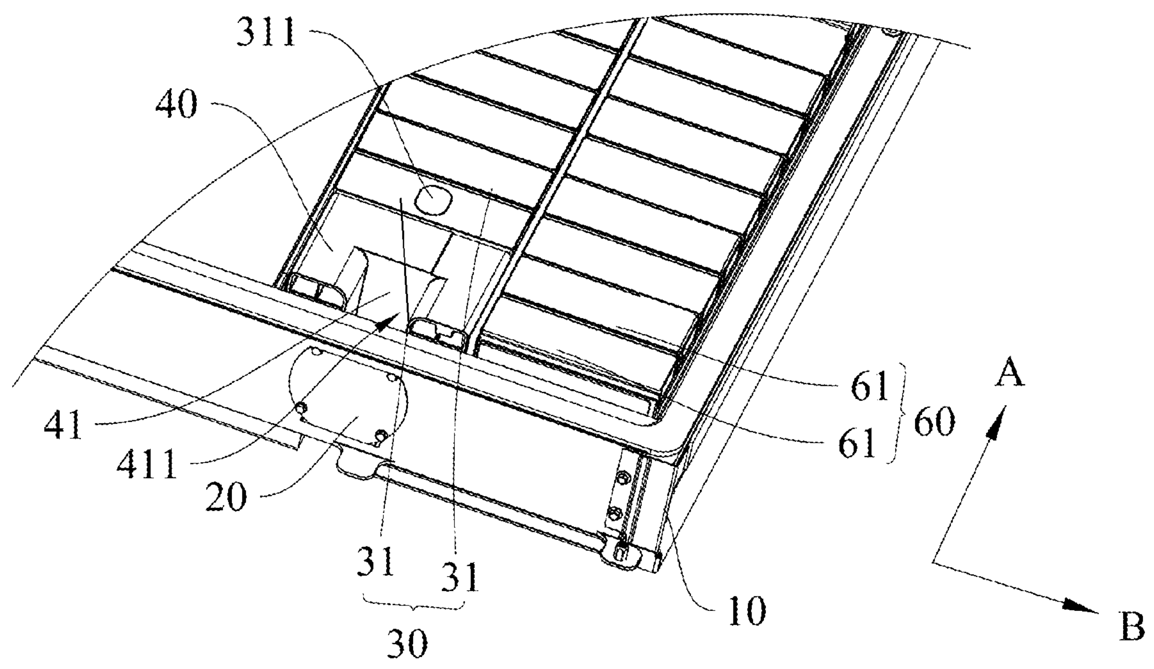
FIG. 2 is a schematic diagram of an internal partial structure of a battery pack according to a first exemplary embodiment.
Figure 3:
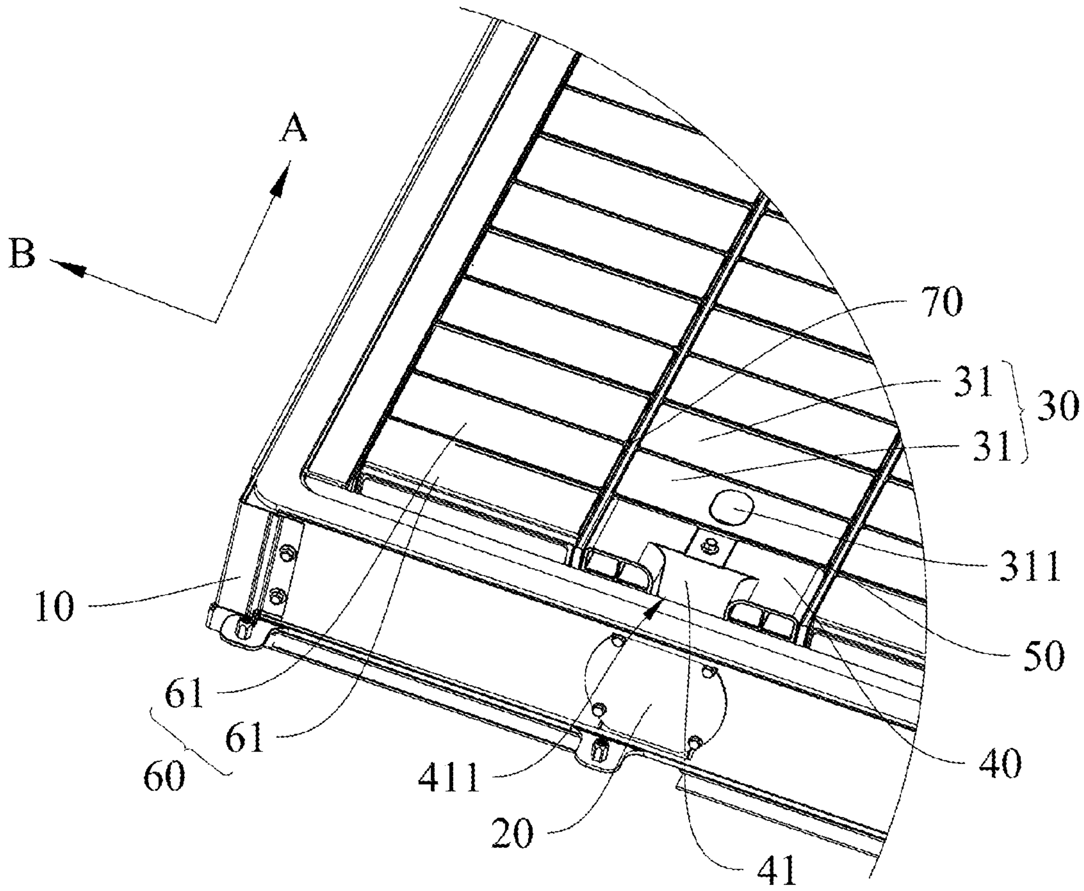
FIG. 3 is a schematic diagram of an internal partial structure of a battery pack according to a second exemplary embodiment.
Figure 4:
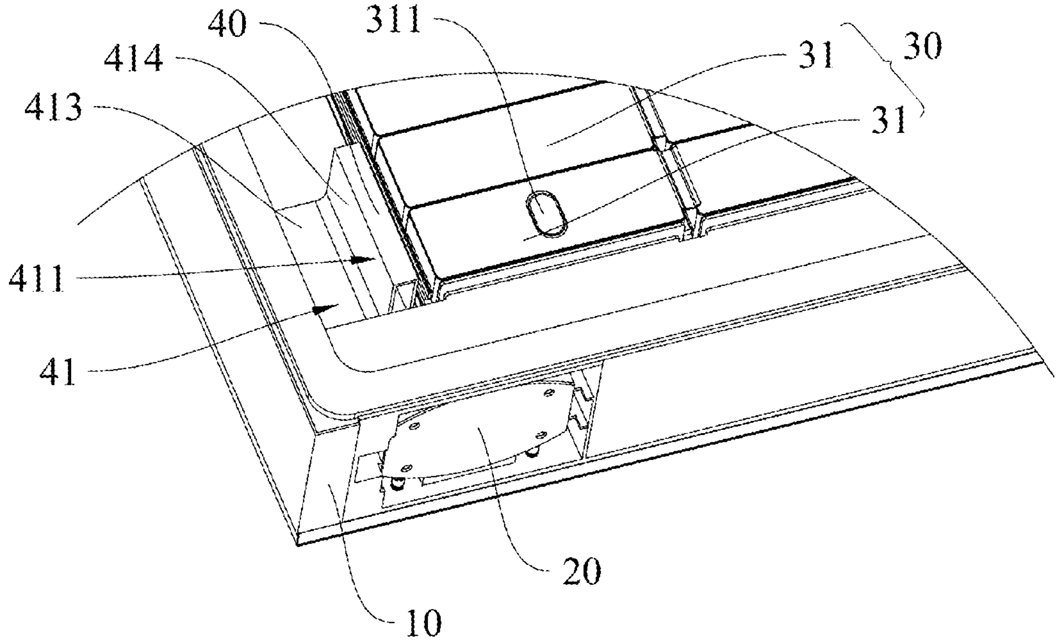
FIG. 4 is a schematic diagram of an internal partial structure of a battery pack according to a third exemplary embodiment.

In an embodiment, as shown in FIG. 2 to FIG. 4, an explosion-proof valve 311 is provided on one side of the first single cell 31 facing the top portion of the battery box body 10. That is, after the explosion-proof valve 311 is broken through, the gas inside the battery may be discharged. Moreover, the gas may enter the gas guiding channel 41 from the top portion of the reinforcement member 40, and the gas guiding channel 41 is arranged at the top portion of the reinforcement member 40.

An explosion-proof valve 311 is provided on one side of the first single cell 31 facing the top portion of the battery box body 10. In this case, a gas guiding channel 41 may be provided at one side of the reinforcement member 40 facing the top portion of the battery box body 10, and the first opening 411 faces the top portion of the battery box body 10.

In some embodiments, an explosion-proof valve 311 is provided on one side of the first single cell 31 facing the bottom portion of the battery box body 10. A gas guiding channel 41 may be provided at one side of the reinforcement member 40 facing the bottom portion of the battery box body 10. The first opening 411 faces the bottom portion of the battery box body 10.

In an embodiment, as shown in FIG. 4 to FIG. 6, the gas guiding channel 41 includes a bottom wall 413 and at least one side wall 414, so that the gas guiding channel 41 may be used for accumulating gas, and may be brought into contact with the pressure relief structures 20 in time to open the pressure relief structure 20 in a timely manner.

In an embodiment, at least part of the side wall 414 is substantially perpendicular to the bottom wall 413. On the basis of ensuring that the gas may be efficiently accumulated in the gas guiding channel 41, it is also possible to allow a relatively large gas to accumulate in the gas guiding channel 41. Therefore, it is ensured that the gas in the gas guide channel 41 is able to open the pressure relief structure 20 in time, so as to ensure the safety use of the battery pack.

As shown in FIG. 5 and FIG. 6, the number of side walls 414 is three, and the three side walls 414 are arranged around the bottom wall 413, thereby forming a first opening 411 and a second opening 412 as shown in FIG. 3 and FIG. 6, and the first opening 411 is able to be arranged opposite to the pressure relief structure 20. While it is ensured that the gas guiding channel 41 is able to easily collect the gas, the pressure relief structure 20 may be opened in time.

As shown in FIG. 4, the number of the side walls 414 is one, and the side wall 414 is arranged on one side of the bottom wall 413. The gas guiding channel 41 may also be formed between the reinforcement member 40 and the battery box body 10. In this case, it may be considered that the gas guiding channel 41 includes two opposite side walls 414, but the first opening 411 of the gas guiding channel 41 is opposite to the pressure relief structure 20.

In an embodiment, the bottom wall 413 is substantially aligned with the bottom of the pressure relief structure 20, that is, the gas guiding channel 41 will not be higher than the pressure relief structure 20, so that the gas in the gas guiding channel 41 may be reliably in contact with the pressure relief structure 20. In this manner, it is ensured that the gas in the gas guiding channel 41 is able to open the pressure relief structure 20 in time, and after the pressure relief structure 20 is opened, the gas in the gas guiding channel 41 is able to be discharged in time without being accumulated in a large amount below the pressure relief structure 20.

In an embodiment, there is a circular arc transition between at least part of the side wall 414 and the top surface of the reinforcement member 40, so that the gas is able to quickly enter the gas guiding channel 41 for accumulation through the circular arc transition surface, and the circular arc transition surface serves a guiding function. Moreover, the circular arc transition between at least part of the side wall 414 and the top surface of the reinforcement member 40 may also enhance the strength of the structure and avoid stress concentration.

In an embodiment, as shown in FIG. 2 and FIG. 3, the reinforcement member 40 is disposed opposite to the large surface of the first single cell 31, and the first direction is perpendicular to the large surface of the first single cell 31. The large surfaces of two adjacent first single cells 31 are arranged opposite to each other, which not only increases the space utilization of the battery box body 10, but also facilitates the arrangement of the first single cells 31. The reinforcement member 40 is arranged opposite to the large surface of the first single cell 31, so that it is possible to realize the fixing of the first single cell 31, and further ensure that the first battery assembly 30 is stably fixed in the battery box body 10.

The first single cell 31 may include a large surface and a small surface. The large surface of the first single cell 31 may be considered as a surface where the first single cell 31 generates the most heat, and the small surface of the first single cell 31 may be considered as a surface that generates less heat than the large surface of the first single cell 31. Further, the large surface of the first single cell 31 may be considered as the largest surface of the outer surface of the first single cell 31, and the small surface of the first single cell 31 may be considered as a surface with an area smaller than the large surface. For example, the first single cell 31 is a quadrangular prism battery, that is, the first single cell 31 is a square battery. In this case, the first single cell 31 may include two opposite large surfaces and four small surfaces surrounding the large surfaces. The areas of the four small surfaces are all smaller than the areas of the two large surfaces.

In an embodiment, the reinforcement member 40 is independently arranged relative to the battery box body 10, that is, the reinforcement member 40 and the battery box body 10 may be formed independently. During the assembly of the battery pack, the reinforcement member 40 is placed in the battery box body 10, in this way, the first battery assembly 30 may be fixed, and the gas may be collected to avoid accumulation of excessive internal pressure in the battery pack.

The reinforcement member 40 is detachably connected to the battery box body 10, for example, the reinforcement member 40 may be directly pressed between the battery box body 10 and the first battery assembly 30, or the reinforcement member 40 may be bonded to the battery box body 10.

In an embodiment, the reinforcement member 40 is bonded to the first single cell 31, which not only ensures that the reinforcement member 40 is stably fixed in the battery box body 10, avoids problems such as shaking of the reinforcement member 40, but also enables the reinforcement member 40 to be used for fixing the first single cell 31, so as to ensure that the first single cell 31 is stably fixed in the battery box body 10.

The reinforcement member 40 and the first single cell 31 may be bonded directly, and the reinforcement member 40 and the first single cell 31 may be connected through a thermally conductive adhesive. On the basis of ensuring a reliable connection between the reinforcement member 40 and the first single cell 31, heat transfer may be realized. The reinforcement member and the first single cell 31 may be connected through a thermally conductive structural adhesive, which not only ensures the strength of the connection, but also enables heat transfer through the thermally conductive structural adhesive, thereby improving the heat dissipation capability of the first single cell 31.

In an embodiment, the reinforcement member 40 and the first single cell 31 may also be bonded indirectly, and the reinforcement member 40 and the first single cell 31 may be connected through a third component. For example, a graphene sheet may be arranged between the reinforcement member 40 and the first single cell 31, and both sides of the graphene sheet are bonded to the reinforcement member 40 and the first single cell 31 respectively.

In an embodiment, as shown in FIG. 3, a spacer 50 is disposed between the reinforcement member 40 and the first single cell 31, and the spacer 50 includes an insulating part, or the spacer includes a heat insulating part. The arrangement of the spacer 50 can not only ensure that the reinforcement member 40 and the first single cell 31 are stably fixed in the battery box body 10, but also prevent the first single cell 31 from being damaged due to direct squeezing of the reinforcement member 40 and the first single cell 31.

The spacer 50 may include an insulating part, so as to ensure reliable insulation between the reinforcing member 40 and the first single cell 31, so as to prevent the first single cell 31 from transmitting electricity to other conductive structures through the reinforcing member 40 during leakage and causing safety problems. The spacer 50 may be a structure made of plastic, rubber and other materials.

The spacer 50 may include a heat insulating part, thereby ensuring reliable heat insulation between the reinforcement member 40 and the first single cell 31 and avoiding heat transfer between the reinforcement member 40 and the first single cell 31. Especially, when the reinforcement member 40 is located between the first single cell 31 at the end portion of the first battery assembly 30 and the battery box body 10, the spacer 50 provided with a heat insulating part may keep the first battery assembly 30 warm, thus avoiding heat exchange between the reinforcement member 40 and the outside of the battery box body 10, thereby improving thermal consistency of the first battery assembly 30. The spacer 50 may be a structure made of glass fiber, asbestos, air-gel and other materials.

In an embodiment, as shown in FIG. 5 and FIG. 6, the reinforcement member 40 is provided with an avoidance space 42 for accommodating a wire harness assembly. On the basis that the reinforcement member 40 effectively fixes the first single cell 31, it is possible to prevent the reinforcement member 40 from interfering the wire harness assembly, so as to ensure that the wire harness assembly is reliably arranged in the battery box body 10.

The wire harness assembly may be a bus bar, for example, the bus bar is utilized to realize the series or parallel connection between the batteries, and the reinforcement member 40 is provided with an avoidance space 42, which allows a part of the bus bar to be located in the avoidance space 42. On basis of ensuring that the bus bar is arranged stably, it is also possible to avoid the difficulty of arranging the bus bar due to interference.

In an embodiment, as shown in FIG. 5 and FIG. 6, the reinforcement member 40 is provided with a hollow cavity 43, thereby reducing the overall weight of the reinforcement member 40, preventing the reinforcement member 40 from adding excessive weight to the battery pack, and the hollow cavity 43 provided in the reinforcement member 40 will not excessively reduce the structural strength of the reinforcement member 40.

The gas guiding channel 41 of the reinforcement member 40 is able to gather the high-temperature gas generated by the thermal runaway of the battery, so there will be heat concentration in the gas guiding channel 41. The reinforcement member 40 is provided with a hollow cavity 43. Further, the reinforcement member 40 may be a metal piece. Metal has high thermal conductivity, and air has low thermal conductivity, so it is possible to decrease the heat transferred to other adjacent batteries through the reinforcement member 40, thereby reducing the risk of thermal runaway, and also serving the function of reducing weight.

The cavity 43 of the reinforcement member 40 is set facing the battery box body 10. There may be multiple cavities 43, and multiple cavities 43 are formed on the reinforcement member 40 at intervals. The cavity 43 is similar to a groove, so it may be ensured that one side of the reinforcement member 40 facing the first single cell 31 is a substantially integral surface, so as to improve the ability of fixing the first single cell 31.

In an embodiment, in a direction from the bottom portion of the battery box body 10 toward the top portion of the battery box body 10, the height of the reinforcement member 40 is less than or equal to the height of the first single cell 31. That is, the top portion of the first single cell 31 is not lower than the top portion of the reinforcement member 40. In this manner, it is ensured that the reinforcement member 40 is able to reliably fix the first single cell 31, and that the reinforcement member 40 will not be too high and block gas from entering the gas guiding channel 41. Therefore, the gas generated by thermal runaway may be quickly discharged from the pressure relief structure 20.

In an embodiment, in a direction from the bottom portion of the battery box body 10 toward the top portion of the battery box body 10, the height of the reinforcement member 40 is substantially equal to the height of the first single cell 31, that is, the top portion of the first single cell 31 is substantially aligned with the top portion of the reinforcement member 40, so it may be ensured that the reinforcement member 40 is able to reliably fix the first single cell 31.

It should be noted that, in a direction from the bottom portion of the battery box body 10 to the top portion of the battery box body 10, the height of the reinforcement member 40 is substantially equal to the height of the first single cell 31. Considering that the top of the first single cell 31 may be provided with structures such as a raised pole component, in this case, the pole component may be omitted from the height of the first single cell 31, that is, the height of the first single cell 31 may be considered as the distance between the bottom surface and the top surface of the first single cell 31. Furthermore, the reinforcement member 40 is disposed opposite to the large surface of the first single cell 31. In this case, the height of the first single cell 31 may be the height of the large surface. In some embodiments, it is not excluded that the height of the first single cell 31 may be the maximum height of the first single cell 31, for example, the distance from the top of the pole component to the bottom surface of the first single cell 31.

In an embodiment, as shown in FIG. 4, the reinforcement member 40 is disposed opposite to the small surface of the first single cell 31. The first direction is parallel to the small surface of the first single cell 31, that is, the first direction is perpendicular to the large surface of the first single cell 31. The large surfaces of adjacent first single cells 31 are in contact with each other, and the reinforcement member 40 may be regarded as a side portion formed by a plurality of first single cells 31 disposed on the first battery assembly 30.

In an embodiment, as shown in FIG. 4, the pressure relief structure 20 is disposed in the corner area of the battery box body 10 close to the battery box body 10. The reinforcement member 40 is disposed opposite to the first single cell 31 at the end portion of the first battery assembly 30. That is, the first battery assembly 30 may be arranged at a position of the battery box body 10 close to the edge of the battery box body 10, and the reinforcement member 40 is arranged at the edge of the battery box body 10. Therefore, the pressure relief structure 20 may be arranged in the corner area of the battery box body 10 close to the battery box body 10, so as to ensure that the gas in the gas guiding channel 41 of the reinforcement member 40 is able to reliably impact on the pressure relief structure 20.

It should be noted that the corner area of the battery box body 10 may be considered as the transition position between two circumferential outer surfaces of the battery box body 10. For example, when the battery box body 10 is substantially rectangular in structure, the corner area of the battery box body 10 may be considered as a joint position of two surfaces of the rectangular structure.

In an embodiment, the reinforcement member 40 is integrally formed with at least part of the battery box body 10, which not only facilitates the forming of the structure, but also increases the structural strength.

It should be noted that the battery box body 10 may include a bottom plate and a frame. The frame is disposed around the bottom plate, and the first battery assembly 30 is disposed in the frame. The reinforcement member 40 may be disposed between the frame and the first battery assembly 30. The setting of the frame around the bottom plate does not refer to a specific configuration, the emphasis is to illustrate that the frame forms a circumferentially closed space. The frame is connected to the bottom plate, the frame may be arranged on the bottom plate, or the frame may be connected to the circumferential edge of the bottom plate. The battery box body 10 may further include a cover plate connected to the frame.

The bottom plate and the frame form a large cavity, or a partition beam is arranged inside the bottom plate and the frame, so as to separate multiple small spaces. The bottom plate may serve to protect the bottom portion of the battery box body, and the specific structure of the bottom plate is not limited by the disclosure. The frame is connected to the bottom plate, and the frame may be formed by splicing a plurality of beams, or the frame may also be a whole plate-shaped structure enclosing a circumferentially closed space.

Regarding the top portion of the battery box body 10, the bottom portion of the battery box body 10, and the side portion of the battery box body 10, in this case, it may be considered that the battery box body 10 is placed on a horizontal plane, the top of the battery box body 10 is the top portion of the battery box body 10, the bottom of the battery box body 10 is the bottom portion of the battery box body 10, and the side of the battery box body 10 is the side portion of the battery box body 10. The top portion of the battery box body 10 corresponds to the cover plate, the bottom portion of the battery box body 10 corresponds to the bottom plate, and the side portion of the battery box body 10 corresponds to the frame.

The reinforcement member 40 may be integrally formed with the bottom plate, or the reinforcement member 40 may be integrally formed with the frame.

In an embodiment, as shown in FIG. 2 and FIG. 3, the battery pack further includes: a second battery assembly 60, and the second battery assembly 60 includes a plurality of second single cells 61 arranged along the first direction. The first battery assembly 30 and the second battery assembly 60 are arranged on the battery box body 10 along the second direction, and the first direction is perpendicular to the second direction. One side of the second single cell 61 at the end portion of the second battery assembly 60 facing the battery box body 10 is aligned with one side of the reinforcement member 40 facing the battery box body 10. That is, the second single cell 61 of the second battery assembly 60 located on one side of the reinforcement member 40 may be in contact with the battery box body 10 without being fixed by the reinforcement member 40.

The number of the first single cell 31 of the first battery assembly 30 may be less than the number of the second single cell 61 of the second battery assembly 60. For example, the number of the first single cell 31 of the first battery assembly 30 may be two less than the number of the second single cell 61 of the second battery assembly 60. In this case, the reinforcement member 40 may substantially occupy the space of two first single cells 31, as shown in FIG. 2. Alternatively, the number of first single cell 31 of the first battery assembly 30 may be one less than the number of second single cell 61 of the second battery assembly 60. In this case, the reinforcement member 40 may substantially occupy the space of one first single cell 31, as shown in FIG. 3.

The first single cell 31 and the second single cell 61 may be the same battery. The battery includes a core and an electrolyte, the minimum unit capable of performing electrochemical reactions such as charging/discharging. The core refers to a unit formed by winding or laminating a stack portion including a first electrode sheet, a separator and a second electrode sheet. When the first electrode sheet is a positive electrode sheet, the second electrode sheet is a negative electrode sheet, and the polarities of the first electrode sheet and the second electrode sheet are interchangeable.

The battery is a stacked battery, which is not only convenient for grouping, but also can be processed to obtain a battery with a long length.

Specifically, the core is a laminated core, and the core has first electrode sheets stacked on each other, a second electrode sheet electrically opposite to the first electrode sheet, and a separator sheet arranged between the first electrode sheet and the second electrode sheet. In this manner, multiple pairs of the first electrode sheets and the second electrode sheets are stacked to form a laminated core.

Optionally, the battery may be a wound battery, that is, the first electrode sheet, the second electrode sheet that is electrically opposite to the first electrode sheet, and the separator sheet disposed between the first electrode sheet and the second electrode sheet are wound to obtain a wound-type core.

In an embodiment, as shown in FIG. 4, the second single cell 61 at the end portion of the second battery assembly 60 is located in the corner area of the battery box body 10, that is, one end of the second single cell 61 of the second battery assembly 60 is set close to the circumferential inner edge of the battery box body 10.

It should be noted that the battery box body 10 may be only provided with the first battery assembly 30 and the second battery assembly 60 therein, or the battery box body 10 may be further provided with a third battery assembly, a fourth battery assembly, etc., the disclosure is not limited thereto. For example, battery box body 10 may be provided with four rows of battery assemblies, correspondingly, the battery box body 10 may be provided with two reinforcement members 40, and the two reinforcement members 40 may respectively correspond to a pressure relief structure 20, and the two reinforcement members 40 may be any one shown in FIG. 5 and FIG. 6.

In an embodiment, as shown in FIG. 3, a heat exchange member 70 is provided between the first battery assembly 30 and the second battery assembly 60, and a heat insulating member is provided between the heat exchange member 70 and the reinforcement member 40. The heat exchange member 70 may ensure that the first battery assembly 30 and the second battery assembly 60 have relatively balanced heat, so as to avoid the problem of high temperature at a local portion. Moreover, the setting of the heat insulating member may prevent the heat exchange member 70 from exchanging heat with the reinforcement member 40, so as to improve the heat exchange efficiency of the battery pack.

The heat exchange member 70 may be a liquid heat exchange member, or the heat exchange member 70 may be a gas heat exchange member, and the heat exchange member 70 may be used for heating, or the heat exchange member 70 may be used for cooling.

In an embodiment, the battery pack further includes a bus bar, and the first single cell 31 at the end portion of the first battery assembly 30 is connected to the second single cell 61 at the end portion of the second battery assembly 60 through the bus bar. A part of the bus bar is located above the reinforcement member 40, that is, the bus bar may cross the reinforcement member 40 to complete the connection between the first single cell 31 and the second single cell 61. Not only the connection is easy, but the structure is also relatively simple. In this way, it is possible to prevent the internal resistance from increasing due to long bus bar, thereby reducing safety risks.

In some embodiments, the first battery assembly 30 and the second battery assembly 60 may be connected through a bus bar, and the bus bar may be connected to the first single cell 31 and the second single cell 61 of the first battery assembly 30 and the second battery assembly 60 located at another end opposite to the reinforcement member 40.

It should be noted that each of the first single cells 31 of the first battery assembly 30 may be connected in series, each of the second single cells 61 of the second battery assembly 60 may be connected in series, and the first battery assembly 30 and the second battery assembly 60 may be connected in series, or the first battery assembly 30 and the second battery assembly 60 may be connected in series, the disclosure provides no limitation thereto.

Other embodiments of the disclosure will be apparent to those skilled in the art from consideration of the specification and practice of the disclosure disclosed herein. The disclosure is intended to cover any variations, uses or adaptations of the disclosure. These variations, uses, or adaptations follow the general principles of the disclosure and include common general knowledge or conventional technical means in the art that are not disclosed in the present disclosure. The specification and embodiments are illustrative, and the real scope and spirit of the present disclosure is defined by the appended claims.

It should be understood that the disclosure is not limited to the precise structures that have been described above and shown in the drawings, and various modifications and variations can be made without departing from the scope thereof. The scope of the disclosure is limited only by the appended claims.

What is claimed is:

1. A battery pack, comprising:

a battery box body;

a pressure relief structure, which is disposed on the battery box body;

a first battery assembly, which comprises a plurality of first single cells disposed along a first direction, wherein the first battery assembly is disposed in the battery box body;

a reinforcement member, which is disposed in the battery box body, and is located between the battery box body and the first battery assembly, wherein the reinforcement member is provided with a gas guiding channel, the gas guiding channel comprises a first opening, and an orthographic projection of the first opening facing a surface of the battery box body provided with the pressure relief structure coincides with at least a part of the pressure relief structure, such that a gas discharged from the first opening is in contact with the pressure relief structure, a second battery assembly, which comprises a plurality of second single cells disposed along the first direction, wherein the first battery assembly and the second battery assembly are disposed on the battery box body along a second direction, and the first direction is perpendicular to the second direction, wherein one side of the second single cell at an end portion of the second battery assembly facing the battery box body is aligned with one side of the reinforcement member facing the battery box body, wherein the first single cell at an end portion of the first battery assembly and the second single cell at the end portion of the second battery assembly are adapted to be electrically connected to each other through a bus bar, wherein the reinforcement member is provided with an avoidance space for accommodating a part of the bus bar, and the avoidance space is located above the reinforcement member.

2. The battery pack according to claim 1, wherein the gas guiding channel further comprises a second opening, and the first opening intersects the second opening.

3. The battery pack according to claim 2, wherein the pressure relief structure is disposed on a side portion of the battery box body, the first opening is disposed on one side of the reinforcement member facing the side portion of the battery box body, and the second opening is disposed on one side of the reinforcement member facing a top portion of the battery box body.

4. The battery pack according to claim 3, wherein the gas guiding channel comprises a bottom wall and at least one side wall.

5. The battery pack according to claim 4, wherein at least a part of the side wall is perpendicular to the bottom wall;

wherein the number of the side wall is one, or the number of the side wall is three.

6. The battery pack according to claim 4, wherein the bottom wall is aligned with a bottom of the pressure relief structure.

7. The battery pack according to claim 4, wherein a circular arc transition is formed between at least a part of the side wall and a top surface of the reinforcement member.

8. The battery pack according to claim 1, wherein the first single cell comprises a large surface and a small surface, an area of the large surface is larger than an area of the small surface, and the reinforcement member is disposed opposite to the large surface of the first single cell;

wherein the first direction is perpendicular to the large surface of the first single cell.

9. The battery pack according to claim 8, wherein the reinforcement member is independently disposed relative to the battery box body.

10. The battery pack according to claim 1, wherein the reinforcement member is bonded to the first single cell.

11. The battery pack according to claim 1, wherein the reinforcement member is provided with a hollow cavity.

12. The battery pack according to claim 1, wherein a spacer is disposed between the reinforcement member and the first single cell, and the spacer comprises an insulating part, or the spacer comprises a heat insulating part.

13. The battery pack according to claim 1, wherein a bottom portion of the battery box body is set facing a top portion of the battery box body, a height of the reinforcement member is less than or equal to a height of the first single cell.

14. The battery pack according to claim 1, wherein the first single cell comprises a large surface and a small surface, an area of the large surface is larger than an area of the small surface, and the reinforcement member is disposed opposite to the small surface of the first single cell;

wherein the first direction is parallel to the small surface of the first single cell.

15. The battery pack according to claim 14, wherein the pressure relief structure is disposed in a corner area of the battery box body close to the battery box body;

wherein the reinforcement member is disposed opposite to the first single cell at an end portion of the first battery assembly.

16. The battery pack according to claim 14, wherein the reinforcement member is integrally formed with at least a part of the battery box body.

17. The battery pack according to claim 1, wherein the second single cell at the end portion of the second battery assembly is located in a corner area of the battery box body.

18. The battery pack according to claim 1, wherein a heat exchange member is provided between the first battery assembly and the second battery assembly.

* * * * *